United States Patent [19]

Goldstein et al.

[11] Patent Number: 5,145,752
[45] Date of Patent: Sep. 8, 1992

[54] ELECTRODES FOR METAL/AIR BATTERIES AND BIPOLAR METAL/AIR BATTERIES INCORPORATING THE SAME

[75] Inventors: Jonathan Goldstein; Menachem Korall; Avner Brokman, all of Jerusalem, Israel

[73] Assignee: Luz Electric Fuel Israel Limited, Jerusalem, Israel

[21] Appl. No.: 633,514

[22] Filed: Dec. 31, 1990

[51] Int. Cl.⁵ ............................................. H01M 4/86
[52] U.S. Cl. ........................................ 429/27; 429/42; 429/210; 429/34
[58] Field of Search ............... 429/27, 34, 210, 40, 429/38, 39, 42, 44

[56] References Cited

U.S. PATENT DOCUMENTS

| | | | |
|---|---|---|---|
| 3,288,652 | 11/1966 | Leavitt | 429/210 X |
| 4,126,733 | 11/1978 | Doniat | 429/27 X |
| 4,463,064 | 7/1984 | Ruch et al. | 429/27 |
| 4,503,132 | 3/1985 | Struther | 429/27 X |
| 4,814,240 | 3/1989 | Zaromb | 429/15 |

Primary Examiner—Anthony Skapars
Attorney, Agent, or Firm—Fleit, Jacobson, Cohn, Price, Holman & Stern

[57] ABSTRACT

The invention provides a bipolar electrode for use in a primary metal/air battery of the type having a metallic slurry anode, the electrode comprising a current-collecting, electrolyte-impervious metallic structure having a first surface for collecting current from the metallic slurry anode, and a metallic air cathode spaced from the structure and having a plurality of electrically-conductive protrusions extending at least from a central area of a first surface thereof and attached to a second surface of the structure, a second surface of the air cathode being provided with an inner hydrophobic waterproof barrier layer which is impermeable to electrolyte but permeable to oxygen gas and coated with an outer active catalytic layer.

16 Claims, 2 Drawing Sheets

ELECTRODES FOR METAL/AIR BATTERIES AND BIPOLAR METAL/AIR BATTERIES INCORPORATING THE SAME

The present invention relates to electrodes for metal/air batteries, as well as to bipolar metal/air batteries incorporating the same.

Metal/air batteries of monopolar and bipolar design, both rechargeable and primary, as well as electrodes therefor, are known in the art as described, e.g., in U.S. Pat. Nos. 3,549,422; 4,246,324; 4,341,847; 4,463,064; 4,565,749; 4,585,710; 4,877,694; 4,908,281; 4,925,744 and 4,957,826.

As is known and described, e.g., in U.S. Pat. No. 4,908,281, metal/air batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell. During cell operation oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added oxygen-reduction catalyst) in association with a finely divided hydrophobic polymeric material and incorporating a metal screen as the conductive element. A variety of anode metals have been used or proposed; among them, zinc, iron, lithium, aluminum, or alloys thereof are considered especially advantageous for particular applications, owing to their low cost, light weight, and ability to function as anodes in metal/air batteries using a variety of electrolytes.

A typical aluminum/air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface.

Aqueous electrolytes for metal/air batteries consist of two major types, namely a neutral-pH electrolyte and a highly alkaline electrolyte. The neutral-pH electrolyte usually contains halide salts and, because of its relatively low electrical conductivity and virtual insolubility of aluminum therein, is used for relatively low power applications. The highly alkaline electrolyte usually consists of NaOH or KOH solution, and yields a higher cell voltage than the neutral electrolyte.

Furthermore, as described, e.g., in U.S. Pat. No. 4,246,324, in many cases these batteries are recharged with the electordes in place by redepositing or partially redepositing the consumable metal on the anode by applying an external potential to the individual units or the entire energy storage system. However, such batteries in practice are never completely restored or recharged to their original state and become progressively shorter-lived and must be out of use for considerable time during recharging.

Other types of batteries are provided with anodes which are removable from and reinsertable into an enclosing cathode chamber. The anodes are usually of consumable metal, or consumable, compacted or sintered metal powder, mounted on conductive, porous metal supports or screens of various metals such as nickel, iron, copper, titanium, tantalum and alloys thereof. The removal and insertion of the anodes of such prior art batteries into the cathode chambers present problems because of shape changes in the anode structure during recharging outside the cathode chamber or envelope and because the electrolyte-impregnated separators in the cathode chambers are often torn or destroyed during removal or reinsertion of the re-coated anodes.

U.S. Pat. No. 4,246,324 attempts to solve this problem by providing a battery comprising an inert container, housing a plurality of hollow, box-like cathode elements and consumable metal anode elements in spaced relationship, each of said box-like cathode elements having at least one gas-permeable, porous cathode in at least one wall and at least one consumable metal anode separate from and removably supported opposite said gas-permeable, porous cathode, and cathode and anode of adjacent elements being disposed in spaced facing relationship; means to maintain an electrolyte in the spaces between the cathodes and anodes; means to feed a depolarizing gas through the interior of said box-like cathode elements to the porous cathodes; means for collecting precipitated material below said anode and cathode elements, and means to electrically connect said cathode and anode elements to an external load, said anode elements being removable and reinsertable in said container.

According to the present invention, there is now provided a bipolar electrode for use in a primary metal/air battery of the type having a metallic slurry anode, said electrode comprising:

a) a current-collecting electrolyte impervious metallic structure having a first surface for collecting current from said metallic slurry anode; and b) a metallic air cathode spaced from said structure and having a plurality of electrically conductive protrusions extending at least from a central area of a first surface thereof and attached to a second surface of said structure, a second surface of said air cathode being provided with an inner hydrophobic waterproof barrier layer which is impermeable to electrolyte but permeable to oxygen gas and coated with an outer active catalytic layer.

In preferred embodiments of the present invention, the distance between said structure and said air cathode is about 2-3 mm, into which space oxygen is delivered for reduction at the catalytic layer.

Said protrusions are preferably in the form of an array of pins extending at least from the central area of the air cathode and attached to the central area of the adjacent current-collecting structure, which enables these pins to tap the current from the central parts of the electrode, as well as to form a structural brace for said central sections to prevent them from bulging under pressure from the electrolyte slurry.

Preferably, each of said pins has a diameter of about 1 mm and a length of about 2-3 mm, and an array will comprise at least 9 centrally positioned pins.

While substantially cylindrical pins are preferred, it will be realized that protrusions of other shapes could also be used.

Similarly, while said protrusions will be described hereinafter as being spot-welded to the structure and to the air cathode, said structure or said cathode could be cast or pressed with said protrusions as an integral part thereof.

As stated, said electrode is intended for use with a metallic slurry anode, preferably of a static bed type as described hereinafter, and as such, is specifically designed to solve the unique problem inherent therein, i.e., that during discharge the metallic particles in the slurry form discharge products, which causes the slurry to undergo volume changes resulting in pressure forces acting on the electrode.

In both U.S. Pat. Nos. 4,463,064 and 4,925,744 there are described metal/air batteries in which the cathode and anode are electrically interconnected; however, in both of said patents, the electrical connectors are positioned along peripheral edges of the electrodes and do not, and were not intended to, provide structural support to the central area of the electrode, as advantageously taught for the first time by the present invention.

Similarly, U.S. Pat. No. 4,341,847 teaches the use of a zinc electrolyte slurry in a zinc-oxygen cell; however, said patent is based on the use of a tubular housing through which the slurry circulates, and therefore does not teach the aforementioned problem or the present solution thereof.

Preferably, said protrusions are made of nickel, steel, copper or nickel-coated steel, and nickel is especially preferred for this purpose.

The current-collecting structure of the present invention is chemically inert, both with respect to the electrolyte and the slurry, and is preferably made of nickel or silver, or steel coated with nickel or silver, and use of a nickel foil for this purpose is especially preferred.

The air cathode can be formed of a conducting metallic mesh, as known in the art, said metal being nickel, steel, copper, nickel-coated steel, or a valve metal such as titanium, tantalum, tungsten, zirconium, niobium, hafnium, vanadium, yttrium or alloys thereof, with nickel being especially preferred.

Preferably said mesh has a thickness of about 0.1 to 0.2 mm and a density of about 100 holes/inch.

The density of the array of protrusions is preferably such that, at a peak current of 200 milliamps/cm$^2$ on the air cathode, no more than 100 milliwatts per cell is lost.

As stated, gas permeable porous cathodes formed of sintered particles are known, e.g., from U.S. Pat. No. 4,246,324; however, as is known, a sintered compact of particles has a limited porosity of only about 30-65%, is prone to cracking and does not have the resiliency and adaptability to pressure and expansion forces exhibited by the presently proposed metallic electrode.

As is known, most of the prior art patents rely on a mechanically removable solid anode with the disadvantages inherent therein.

In contradistinction to said prior art systems, the present invention provides a bipolar primary metal/air battery of the type having a plurality of electrically series-connected cells, each cell comprising:

a) a metallic slurry anode, containing oxidizable metal particles and an alkaline electrolyte;

b) a current-collecting, electrolyte-impervious metallic structure having a first surface in contact therewith for collecting current from said metallic slurry anode;

c) a metallic air cathode spaced from said structrue and having a plurality of electrically-conductive protrusions extending at least from a central area of a first surface thereof and attached to a second surface of said structure, a second surface of said air cathode being provided with an inner hydrophobic waterproof barrier layer which is impermeable to electrolyte but permeable to oxygen gas, and coated with an outer active catalytic layer;

d) means for introducing oxygen into said space, between said structure and said air cathode, and e) a porous separator positioned adjacent to said second surface of said air cathode and which allows the migration of said alkaline electrolyte therethrough.

As will be realized, one advantage of the battery of the present invention is the provision of a metallic slurry anode in which the oxidizable metal component is present in the form of a mechanically refillable slurry with the electrolyte, whereby upon complete discharge, the spent slurry can simply be rinsed out, e.g., with alkali solution, and a fresh portion of slurry introduced or pumped into the cells.

Furthermore, this metallic slurry anode can be maintained in a static bed and used in combination with a permanently affixed bipolar electrode according to the present invention.

In especially preferred batteries of the present invention, said air cathode is provided with an oxygen-rich, electrolyte-immiscible organic fluid for supplying oxygen to said positive air electrode.

The term "oxygen-rich organic fluid" as used herein relates to any such fluid having an ability to retain at least 15% oxygen, i.e., a fluid capable of carrying at least 15 ml oxygen/100 ml fluid.

Fluids having a high affinity for oxygen and which readily facilitate the diffusion of oxygen in and out of said fluid, in an order of at least 30 ml oxygen/100 ml fluid, are especially preferred.

It is also to be noted that the term "organic fluid" as used herein includes viscous fluids which can be smeared on the cathode structure and which enable oxygen diffusion therethrough, while serving as a supplementary hydrophobic layer.

The fluid could be an oil such as a fluorinated hydrocarbon with high oxygen solubility, or an oil or fluid containing a dissolved oxygen-trapping compound such as a macrocyclic. Other non-halogenated oils suitable for use include silicone oils, such as Dow Corning 200; high-boiling mineral oils and hydrocarbons, such as decane, $C_{10}H_{24}$.

Especially preferred for use in the present invention are perfluorocarbon compounds, because of their especially high affinity for oxygen; however, other oxygen-rich organic fluids such as the aforementioned silicone oils, mineral oils, hydrocarbons and fluorinated hydrocarbons may alternatively be preferred for economic reasons.

The perfluorocarbon compounds are dense liquids of a low surface tension, immiscible with water and are noted for their ability to dissolve about 40% of oxygen at 37° C. and at atmospheric pressure (water dissolves only 2.3% oxygen by volume). These compounds are considered as oxygen carriers and releasing agents, thus serving as temporary substitutes for blood in severe cases of hemorrhage or ischemia. The chemistry and properties of perfluoronated liquids are summarized in *Federation Proceedings*, Vol. 29, No. 5, September-October 1970. To the best of our knowledge, however, no attempts have been made to use such fluids as vehicles for delivering oxygen to a metal/air battery.

Suitable perfluorocarbon compounds for use in the present invention include perfluorotripropylamine cis- and trans-perfluorodecalin, perfluoroisopentyltetrahydropyrane, perfluoro-N,N-dimethylcyclohexylamine, perfluoro-1-methyl decalin, perfluoroperhydrophenanthrene and perfluorotributylamine.

Preferably said perfluorocarbon compound is selected from cis-perfluorodecalin, trans-perfluorodecalin, perfluoro-1-methyl decalin, perfluorotripropylamine and perfluoro-tributylamine.

In these preferred embodiments there would also be included means for pumping the fluid through the space adjacent the air electrode.

The presently proposed battery system is appreciably advantageous over prior art batteries, especially when using the preferred oxygen-rich fluid, inter alia, in light to the facts that:

a) An air cathod having its central area braced by a plurality of protrusions which also serve to brace the central area of the current-collecting structure, is particularly robust without impeding the flow oxygen to the air cathode.

b) Using a fluid of a type which is immiscible with an alkaline electrolyte, prevents the evaporation of water vapor by acting as an additional hydrophobic barrier.

c) By pumping fluid through the air electrode, the problem of thermal balance in the cells could be more easily controlled.

d) By varying the pumping rate of fluid through the space adjacent the air cathode, the amount of pure $O_2$ available to the air electrode current collector changes. Thus, an increased pumping rate gives increased EV battery power for acceleration.

e) Since there are no air gaps in the stack, the battery is characterized by improved robustness.

As stated, the electrolyte-facing surface of the air cathode is provided with an active catalytic layer as is known, per se, in the art, using a catalyst such as the platinum group metals, including a platinum black; platinum group metal oxides; platinum activated carbon; silver (e.g., Raney silver); macrocyclics, such as cobalt macrocyclic or cobalt pthalocyanine, or other catalytic metal oxides such a perovskites, delafossites, bronzes or spinel-type oxides.

Beneath said active catalytic layer there is provided a hydrophobic waterproof barrier layer which is impermeable to electrolyte but permeable to oxygen, of the type also known per se in the art, using, e.g. a lipophobic (e.g. hydrophobic) resin such as PTFE, polyethylene, polychlorofluoroethylene, various vinyl resins, and the like, in such a way as to let the resin penetrate inside the pores for a certain depth from the surface. The resin forms a waterproof barrier beneath the second surface of the air cathode and imparts hydrophobic properties thereto, thereby effectively preventing flooding of the air cathode by the electrolyte, and facilitating the maintenance of the three-phase boundary layer with oxygen and electrolytes in the catalytic layer along said surface. Thus, the air cathode is gas permeable to allow oxygen to reach the catalytic reaction site, but is liquid impermeable to retain the electrolyte.

When the terminology "oxygen" is used in this disclosure and claims, it is understood that a wide number of gases containing substantial portions of oxygen, such as air, are satisfactory for use with the oxygen diffusion cathodes in the cells of this invention. The only requirement is that sufficient oxygen be supplied for reduction without associated gases reacting in an adverse manner with the electrodes or electrolyte.

The electrolyte may be any suitable alkaline aqueous electrolyte such as about 4 to 12N potassium hydroxide or sodium hydroxide. In the embodiment of the invention utilizing chemically non-reactive anode surfaces, a slurry of anode-active metal particles is maintained in a static bed during use and hydraullically replaced after discharge. Suitable anode-active metal particles include zinc particles having a size in the order of 50–500 microns present in an amount by weight of zinc in the electrolyte, of about 30 to 70 percent of the weight of the electrolyte.

In operation, the zinc from the anode active zinc particle slurry is converted to zincates which are removed from the electrochemical cell in the electrolyte.

The invention will now be described in connection with certain preferred embodiments with reference to the following illustrative examples and attached figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

The figures will be referred to in conjunction with the following examples to facilitate a better understanding of the invention.

EXAMPLE 1

Figure 1:
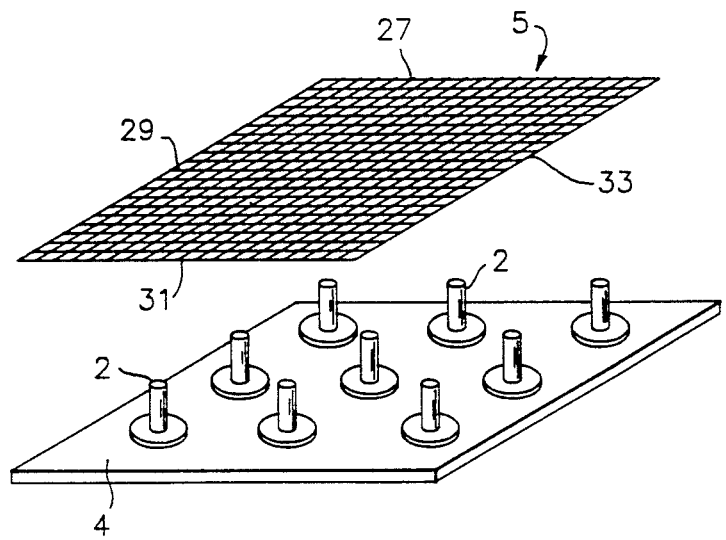
FIG. 1 is an exploded perspective view of an electrode according to the present invention.
Figure 1A:
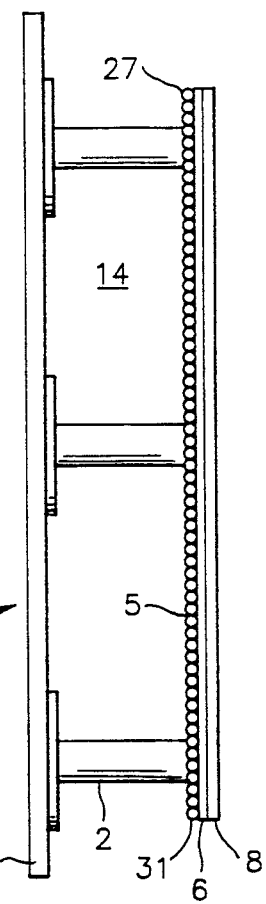
FIG. 1a is a cross-sectional view of the electrode of FIG. 1.

An array of nine steel pins 2 (each with diameter 1 mm, height 2 mm, with a cylindrical base 10 mm diameter, 0.2 mm thick) was spot-welded to a nickel foil 4 of dimensions $79 \times 79 \times 0.2$ mm. The pins were placed at centers about 30 mm apart, and the array defined a square about 9.5 mm from the periphery of the foil (as seen in FIGS. 1 and 1a). Onto the tops of the pins was spot-welded a nickel mesh 5 (0.1 mm thick, 100 holes-/inch) of area dimensions $71 \times 71$ mm, so that the mesh overlapped the pins on each side by about 5.5 mm. The surface of the mesh was then made both active for oxygen reduction and hydrophobic to electrolyte penetration, by first pressing into the mesh an inner layer 6 of 10 mg/cm$^2$, PTFE-bonded carbon as a blocking layer, as seen in FIG. 1a, followed by a mixture of PTFE powder and Raney silver catalyst (24 mg/cm$^2$, weight ration PTFE to silver 1:5) as active layer 8. Pressing was conducted at room temperature in a mold at a pressure of 300 kg/cm$^2$.

Following pressing, the electrode was sintered in an oven (340° C., 30 minutes).

The electrode 1 described above can be used as a basic bipolar electrode for a zinc-air battery, with the impregnated side functioning as the air cathode in each cell, and the nickel foil side functioning as the current collector for a metallic slurry anode adjacent thereto. For initial testing, the bipolar electrode was glued into a flat mounting plate 10 of the type illustrated in FIG. 2.

Said mounting plate 10 is formed or molded preferably as one piece from a material of construction which is non-reactive with chemicals present in the battery cell. Useful materials of construction include ceramics, as well as plastics including polyvinyl chloride, nylon, polypropylene and polyphenylene oxide blends with polystyrene, and combinations of the foregoing.

Especially preferred is a mounting plate made of PVC having a central cut-out area 12, sized to tightly fit around the periphery of the mesh 5, as described hereinafter.

A first edge 14 of said cut-out area 12 is provided with a plurality of fluid inlets 16 and the opposite edge 18 is provided with a plurality of fluid outlets 20.

Fluid inlets 16 are connected to and fed by a fluid inlet manifold 22 bored through the plane of said plate and leading to an edge 24 thereof, and fluid outlets 20 are similarly connected to a fluid outlet manifold 26 also bored through the plane of said plate and leading to the edge 24 thereof.

Figure 2:
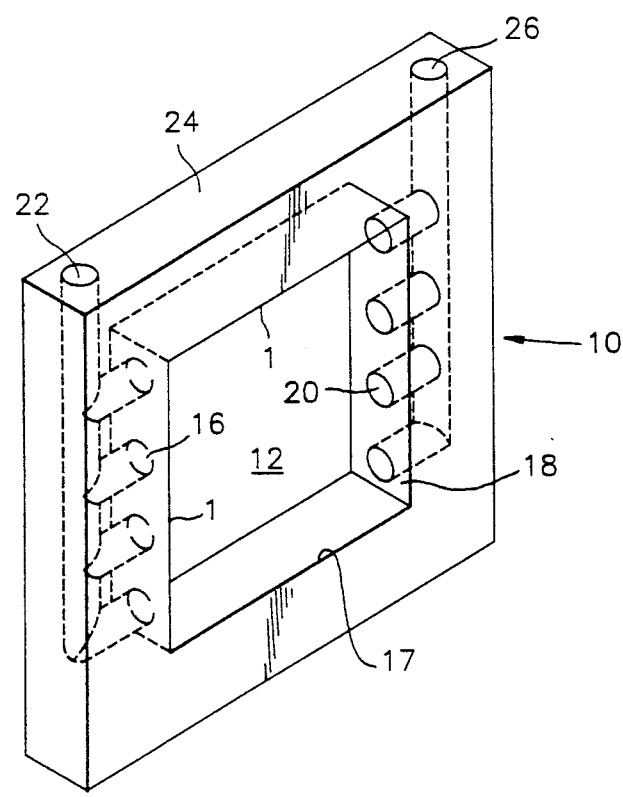
FIG. 2 is a perspective view of a supporting frame element for the electrode of FIG. 1.

Thus, as seen in FIG. 2, there is provided a PVC sheet of a size of 100 mm × 100 mm, 2 mm thick, having a central cut-out window 12 to accommodate the pin-supported mesh and a number of fluid inlet holes 16 and exit holes 20 drilled within the plane of the sheet, so that oxygen-rich fluid could be supplied to and removed from the inner surface of the mesh. The pin-supported mesh is inserted in said cut-out area 12 with the peripheral edges 27, 29, 31 and 33 being glued to the inner surfaces 14, 15, 17 and 18 of the cut-out area 12 of said mounting place 10, e.g., with epoxy glue, which seals said edges and prevents any leakage of electrolyte into the mesh 5 therefrom. A separator (not shown) can then be glued to the electrolyte-facing surface of said mesh 5 and plate 10.

Figure 3:
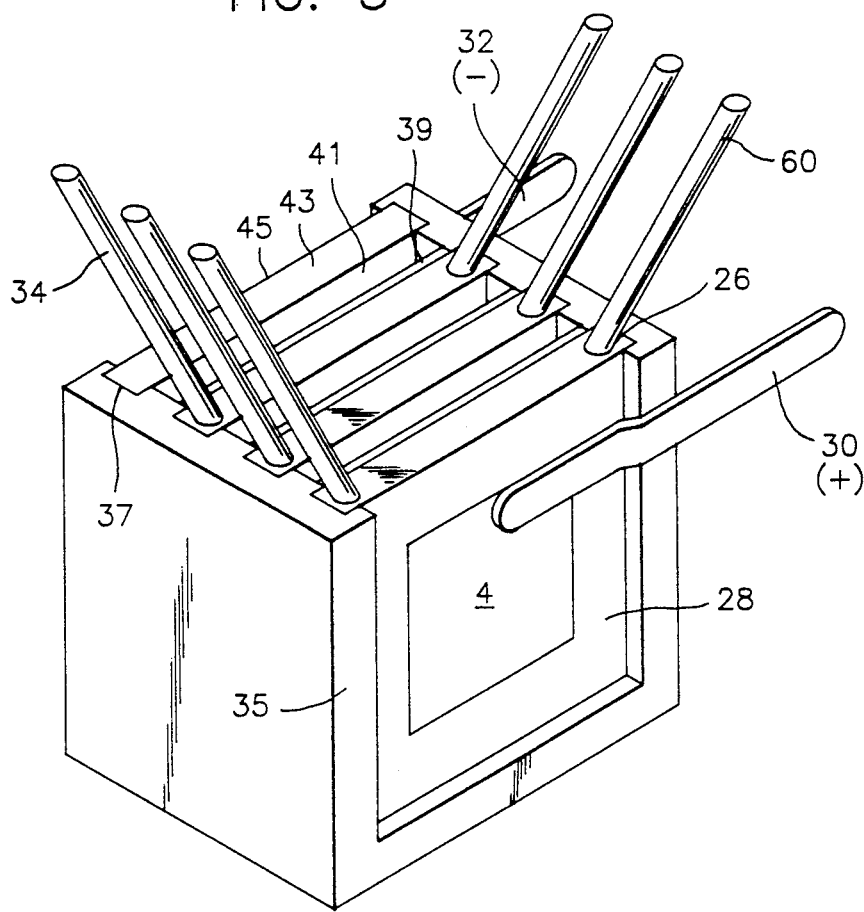
FIG. 3 is a perspective view of an assembled battery of the present invention, in which the electrode of FIGS. 1 and 1a is arranged as a bipolar electrode.
Figure 4:
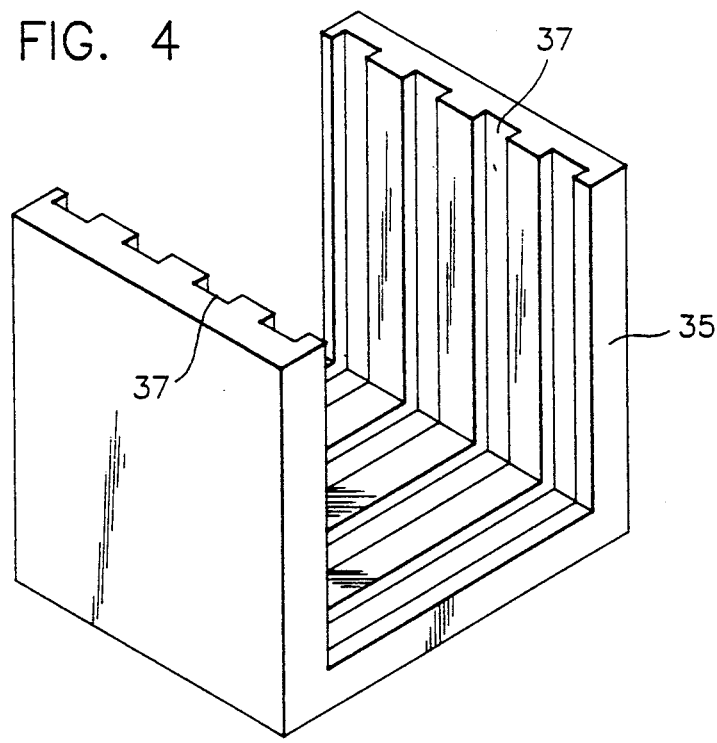
FIG. 4 is a perspective view of a battery container, in which supported bipolar electrodes are insertable and removable.

A three-cell bipolar battery was constructed as shown in FIG. 3, by gluing three of the PVC-mounted bipolar electrodes 1 of FIG. 1a, and a fourth plate-mounted electrode 43 comprising a PVC sheet and a nickel foil only (no mesh), into a U-shaped PVC element 35, having walls of a thickness of 4 mm and provided with grooves 37 sized to receive and retain said plates 10 (see FIG. 4). Care was taken to ensure that in each cell the positive air electrode side faced the negative zinc current collector side of an adjacent electrode, and that the separation 41 between the polyamide separator surface 39 and the nickel foil was about 3 mm. The first plate-mounted electrode 28 in FIG. 3 (positive) was tabbed externally with a welded-on piece of nickel foil 30 of a size of 100 mm × 10 mm × 0.2 mm as shown, to form the positive pole of the three-cell battery, while the fourth plate-mounted electrode 43 in the battery (negative), having a cut-out window but no through-going holes leading thereto, and having only a metal foil glued to the outward facing surface 45 thereof across said window with said nickel foil (not shown), was fitted with a similar welded-on nickel tab 32 to form the negative pole. The battery was first leak-tested (overnight stand with potassium hydroxide solution).

Oxygen was supplied in dissolved form via an organic liquid (not shown). An organic liquid was chosen with an appreciably higher solubility for oxygen than aqueous solutions, also with inertness and immiscibility with respect to the alkaline electrolyte of the battery and with low vapour pressure, and the oil perfluorodecalin was found to be acceptable. A 50 ml portion of oil was maintained saturated with oxygen by continuous bubbling through of air from an aquarium pump (not shown). The oxygen-rich oil was then circulated through the space 14 of the three air electrode elements of the bipolar battery, using a peristaltic pump (not shown), at a rate of 10 cc/min, via inlet hoses 34 attached to inlet manifold 22 for delivering oxygen-rich electrolyte immiscible fluid to said electrode from a reservoir (not shown), and then returned for resaturation with oxygen in said reservoir via outlet hoses 60 attached to outlet manifold 26.

During discharge of electricity from the battery, the depolarizing gas such as oxygen or oxygen-containing gas diffuses from the carrier organic liquid and is contacted with the active layer 6 inside the mesh 5, which is alos in contact with the electrolyte passing through a porous polyamide separator 39. The fluid pressure of the oxygen-rich organic liquid circulated through the mesh 5 is adjusted to the pressure of the electrolyte, for better stability of the system.

To activate the battery, a zinc slurry, comprising 49.5 wt % zinc powder (50–500 micron diameter particles amalgamated with 4% mercury), 50 wt % as potassium hydroxide solution of specific gravity 1.4, and 0.5 wt % of gelling agent (polyacrylic acid), was poured into the space 41 between the separator 39 and the nickel foil in each cell so as to cover the nickel mesh and separator. Approximately 30 cc of slurry containing about 30 g zinc was introduced into each cell, and following wet-in, the air pump and peristaltic pump were switched on. The open current voltage of the battery was about 4.35 V, with approximately equal voltages of 1.45 V/cell indicating that the system was free from short circuits. The system was then discharged at a current of 1.5 A (30 mA/cm$^2$ at the air electrode) and ran for 10 hours until a 3 V cut-off voltage providing an average discharge voltage of 3.6 V (1.2 V/cell). The battery thus delivered 15 Ah at 3.6 V (54 Wh).

The reaction of the battery could be represented by the following formulas:

at the cathode: $\frac{1}{2}O_2 + H_2O + 2e \rightarrow 2OH^-$ at the anode: $Zn + 2OH^- \rightarrow ZnO + H_2O + 2e$ total reaction: $Zn + \frac{1}{2}O_2 \rightarrow ZnO$ The battery had excellent power characteristics, and even after 5 hours discharge, it could still deliver a peak power of 10 A at 2.7 V (200 mA/cm$^2$ peak current at the air electrodes). Following complete discharge, the spent slurry was rinsed out with alkali and a fresh portion of slurry poured into the cells. A discharge performance similar to that of the first cycle was obtained. The compact and robust structure of this bipolar zinc-air battery was noted.

It will be evident to those skilled in the art that the invention is not limited to the details of the foregoing illustrated embodiments, and that the present invention may be embodied in other specific forms without departing from the spirit or essential attributes thereof. The present embodiments are therefor to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A bipolar electrode for use in a primary metal/air battery having a metallic slurry anode, said electrode comprising:
   a) a current-collecting, electrolyte-imprevious metallic structure having a first surface for collecting current from said metallic slurry anode, and
   b) a metallic air cathode spaced from said structure and having a plurality of electrically-conductive protrusions extending at least from a central area of a first surface of said air cathode and attached to a second surface of said current-collecting structure, said protrusions being in the form of an array of pins, which centrally positioned array enables said pins to tap the current from the central parts of the electrode and to form a structural brace for said central sections to prevent said central sections from building under pressure from electrolyte slurry in contact therewith, and to define and limit the space therebetween, a second surface of said air cathode being provided with an inner hydrophobic waterproof barrier layer which is impermeable to electrolyte but permeable to oxygen gas and coated with an outer active catalytic layer.

2. A bipolar electrode as claimed in claim 1, wherein the distance between said structure and said air cathode is about 2–3 mm.

3. A bipolar electrode as claimed in claim 1, wherein each of said pins has a diameter of about 1 mm and a length of about 2–3 mm.

4. A bipolar electrode as claimed in claim 1, wherein said structure is nickel, silver, or silver- or nickel-plated steel.

5. A bipolar electrode as claimed in claim 1, wherein said structure is a nickel foil.

6. A bipolar electrode as claimed in claim 1, wherein said protrusions are made of nickel, steel, copper or nickel-coated steel.

7. A bipolar electrode as claimed in claim 1, wherein said protrusions are made of nickel.

8. A bipolar electrode as claimed in claim 1, wherein said metallic air cathode is in the form of a conducting metallic mesh.

9. A bipolar electrode as claimed in claim 1, wherein said mesh is made of nickel, steel, copper, or nickel-coated steel.

10. A bipolar primary metal/air battery having a plurality of electrically series-connected cells, each cell comprising:
    a) a metallic slurry anode containing oxidizable metal particles and an alkaline electrolyte;
    b) a current-collecting, electrolyte-impervious metallic structure having a first surface in contact therewith for collecting a current from said metallic slurry anode;
    c) a metallic air cathode separated by a space from said structure and having a plurality of electrically-conductive protrusions extending at least from a central area of a first surface of said air cathode and attached to a second surface of said current-collecting structure, said protrusions being in the form of an array of pins, which centrally positioned array enables said pins to tap the current from the central parts of the electrode and to form a structural brace for said central sections to prevent said cental sections from bulging under pressure from electrolyte slurry in contact therewith, and to define and limit the space therebetween, a second surface of said air cathode being provided with an inner hydrophobic waterproof barrier layer which is impermeable to electrolyte but permeable to oxygen gas and coated with an outer active catalytic layer;
    d) means for introducing oxygen into said space between said structure and said air cathode, and
    e) a porous separator positioned adjacent to said second surface of said air cathode and which allows the migration of said alkaline electrolyte therethrough.

11. A bipolar primary metal/air battery as claimed in claim 10, wherein said oxidizable metal particles are selected from the group consisting of zinc, iron, lithium, aluminum, and alloys thereof.

12. A bipolar primary metal/air battery as claimed in claim 10, wherein said oxidizable metal particles are zinc.

13. A bipolar primary metal/air battery as claimed in claim 10, wherein said metallic slurry anode is maintained in a static bed in said cells.

14. A bipolar primary metal/air battery as claimed in claim 10, wherein said space is provided with an oxygen-rich, electrolyte-immiscible organic fluid for supplying oxygen to said positive air electrode.

15. A bipolar primary metal/air battery as claimed in claim 10, wherein said fluid is a perfluorocarbon.

16. A bipolar primary metal/air battery as claimed in claim 10, wherein said fluid is selected from the group consisting of silicone oils, mineral oils, hydrocarbons and fluorinated hydrocarbons having an ability to carry at least 15 ml oxygen per 100 ml fluid.

* * * * *